United States Patent [19]

Fujita

[11] Patent Number: 5,170,084
[45] Date of Patent: Dec. 8, 1992

[54] WIDE-ANGLE ARC SEGMENT MAGNET AND BRUSH MOTOR CONTAINING IT

[75] Inventor: Osamu Fujita, Fukaya, Japan

[73] Assignee: Hitachi Metals Ltd., Tokyo, Japan

[21] Appl. No.: 590,821

[22] Filed: Oct. 1, 1990

[30] Foreign Application Priority Data

Sep. 29, 1989 [JP] Japan .................. 1-253860

[51] Int. Cl.⁵ .......................................... H02K 21/26
[52] U.S. Cl. .................................... 310/154; 335/306; 29/607
[58] Field of Search ............... 310/154, 261, 198, 44, 310/43, 152, 248, 45, 46; 264/62, 61, DIG. 58; 335/296, 302, 304, 306; 148/306; 29/607, 602.1, 596, DIG. 29

[56] References Cited

U.S. PATENT DOCUMENTS

| | | | |
|---|---|---|---|
| 4,383,193 | 5/1983 | Tomite et al. | 310/154 |
| 4,795,932 | 1/1989 | Long | 310/154 |
| 4,845,398 | 7/1989 | De Cesare | 310/261 |

FOREIGN PATENT DOCUMENTS

| | | |
|---|---|---|
| 56-51482 | 12/1981 | Japan . |
| 59-78880 | 5/1984 | Japan . |
| 63-228951 | 9/1988 | Japan . |
| 2-119546 | 5/1990 | Japan . |

*Primary Examiner*—Steven L. Stephan
*Assistant Examiner*—E. To
*Attorney, Agent, or Firm*—Sughrue, Mion, Zinn, Macpeak & Seas

[57] ABSTRACT

In a brush motor comprising a stator assembly constituted by a permanent magnet assembly and a cylindrical yoke, a stator provided with coils diametrically opposing to each other and rotatably disposed within the stator assembly, and a brush, the permanent magnet assembly is constituted by two arc segment magnets each having magnetic anisotropy in a radial direction and an arc angle $\theta$ of 170°–180°, so that the permanent magnet assembly has a magnetic flux density distribution having a smooth wave form substantially free from localized deformations in a circumferential direction approximately on an inner surface thereof. Such an arc segment magnet is manufactured by a wet molding method and sintering.

5 Claims, 5 Drawing Sheets

WIDE-ANGLE ARC SEGMENT MAGNET AND BRUSH MOTOR CONTAINING IT

BACKGROUND OF THE INVENTION

The present invention relates to a wide-angle arc segment magnet supported by a cylindrical yoke for constituting a magnetic circuit for motors, generators, etc., and more particularly to a wide-angle arc segment magnet whose magnetic flux density distribution has a smooth wave form substantially free from deformation in a circumferential direction approximately on an inner surface thereof, when a pair of them are assembled in the magnetic circuit, thereby generating extremely reduced magnetic noises. It further relates to a brush motor containing a pair of such wide-angle arc segment magnets.

Widely used in magnetic circuits of motors, generators, etc. are hard ferrite magnets, Alnico magnets, Mn-Al magnets, Fe-Cr-Co magnets, rare earth magnets (Sm-Co or Nd-B-Fe), etc. Such magnets are generally in the form of a cylinder or an arc obtained by dividing a cylinder, and magnetic anisotropy is given to such magnets in radial directions or in longitudinal directions.

As an arc segment magnet, for instance, Japanese Utility Model Laid-Open No. 59-78880 shows in FIG. 5 an anisotropic magnet having radial magnetic anisotropy, and Japanese Patent Laid-Open No. 2-119546 shows in FIG. 1 an anisotropic magnet having two magnetic poles opposing diametrically. These magnets are produced by different methods.

Magnets are generally produced by a dry molding method or a wet molding method. The dry molding method is considered to be more suitable for the production of magnets in that it takes shorter time than the wet molding method and that it can produce magnets having complicated shapes by utilizing a smaller apparatus. Accordingly, the arc segment magnets are conventionally produced by the dry molding method.

In motors, etc. using arc segment magnets, it is desired that as small magnetic noises as possible are generated in their operation. The magnetic noises are caused by the fact that the magnetic flux density distribution in a magnetic circuit of the motor has a deformed wave form. When there is a deformed wave form, torque generated by a magnetic attraction force between a stator and a rotor is periodically changed, causing a so-called cogging, which means uneven rotation. This cogging is a main cause for noises.

To avoid such magnetic noises, an eccentrically shaped arc segment magnet is used for motors. Further, Japanese Patent Laid-Open No. 63-228951 assigned to Hitachi Metals, Ltd. discloses an arc segment magnet having longitudinal ends each having a skewed shape, and an eccentrically shaped, inner cylindrical surface to stabilize the rotation of a rotor.

However, although the eccentrically shaped arc segment magnets generate reduced magnetic noises, their effective magnetic flux is also reduced since a space factor of the magnet is reduced due to eccentric disposition, meaning that a relative volume of the magnet is reduced. In addition, since sufficient orientation of magnetic anisotropy cannot be achieved in eccentrically shaped magnets, they do not show high magnetic properties even though they are shaped in the form of a ring.

Apart from the above, the dry molding method cannot easily produce an arc segment magnet having an arc angle $\theta$ close to 180°. As shown in FIG. 10, an arc segment magnet is produced by using a die apparatus comprising an upper die 11 having a cylindrical recess, a lower die 12 having an aperture, a plunger 13 having a top surface provided with a cylindrical center projection and movable up and down in the aperture of the lower die 12. A cavity 16 in an arcuate shape is defined by the cylindrical recess of the upper die 11 and the top surface of the plunger 13. The magnet powder is charged into the cavity 16 and compressed by elevating the plunger 13. In this case, if an arc segment magnet to be produced has an arc angle close to 180°, it is difficult to remove the resulting green body from the die without destroying edge portions thereof. In addition, in a dry molding method in which a magnetic field is applied longitudinally, both circumferential ends of a wide-angle arc segment magnet cannot have a high density as compared to a center portion thereof. Accordingly, when a molded product (green body) is taken out of a die, it is likely to be cracked and broken at both circumferential ends. In a dry molding method in which a magnetic field is applied transversely (Japanese Patent Publication No. 56-51482), a wide-angle arc segment magnet cannot be easily removed from a die as an arc angle $\theta$ of the arc segment magnet increases. Accordingly, cracking is also likely to take place. For these reasons, arc segment magnets having arc angles $\theta$ of 150°-165° are generally produced.

On the other hand, in the case of a wet molding method using a magnet powder slurry, a large deformation is more likely to take place than in the case of the die molding method. Particularly, when a die apparatus having a similar structure to that shown in FIG. 10 is utilized, the density of the resulting green body is likely to be uneven. Specifically, a center portion of the resulting arc segment-shaped green body has a higher density, and side portions (circumferential end portions) have a lower density. Accordingly, the sintered arc segment magnet tends to have a large deformation.

Because of the above mentioned problems, a conventional arc segment magnet does not have an arc angle $\theta$ close to 180°. Therefore, when assembled inside a cylindrical yoke of a motor, etc., the resulting arc segment magnet assembly has a large gap which leads to a slight deformation of a wave form of a magnetic flux density distribution. This causes vibration and noises.

OBJECT AND SUMMARY OF THE INVENTION

Accordingly, an object of the present invention is to provide a wide-angle arc segment magnet capable of reducing magnetic noises when assembled in motors, etc.

Another object of the present invention is to provide a brush motor containing such wide-angle arc segment magnets, thereby suffering from less magnetic noises.

As a result of intense research in view of the above objects, the inventors have found that a wide-angle arc segment magnet having an arc angle $\theta$ up to 180° can be produced by a wet molding method.

The wide-angle arc segment magnet according to the present invention is manufactured by a wet molding method and sintering and having an arc angle $\theta$ of 170°-180° and an intrinsic coercive force iHc of 2850 Oe or more.

The brush motor according to the present invention comprises a stator assembly constituted by a permanent magnet assembly and a cylindrical yoke, a rotor provided with coils diametrically opposing to each other and rotatably disposed within the stator assembly, and a brush, the permanent magnet assembly being constituted by two arc segment magnets each having magnetic anisotropy in a radial direction and an arc angle $\theta$ of 170°–180°.

DETAILED DESCRIPTION OF THE INVENTION

The wide-angle arc segment magnet of the present invention, which is produced by a wet molding method, has an arc angle $\theta$ between 170° and 180°. It has a coercive force Hc of 2800 Oe or more and an intrinsic coercive force iHc of 2850 Oe or more. With a coercive force Hc and an intrinsic coercive force iHc lower than the above levels, sufficient magnetic properties cannot be achieved to operate motors, etc.

The wide-angle arc segment magnet desirably has a residual magnetic flux density Br of 3800 G or more, and it desirably shows a magnetic flux density distribution having a smooth wave form substantially free from deformation. Incidentally, the larger the Br, the smaller the Hc. Accordingly, the Br of the wide-angle arc segment magnet is within the above range.

Figure 3:
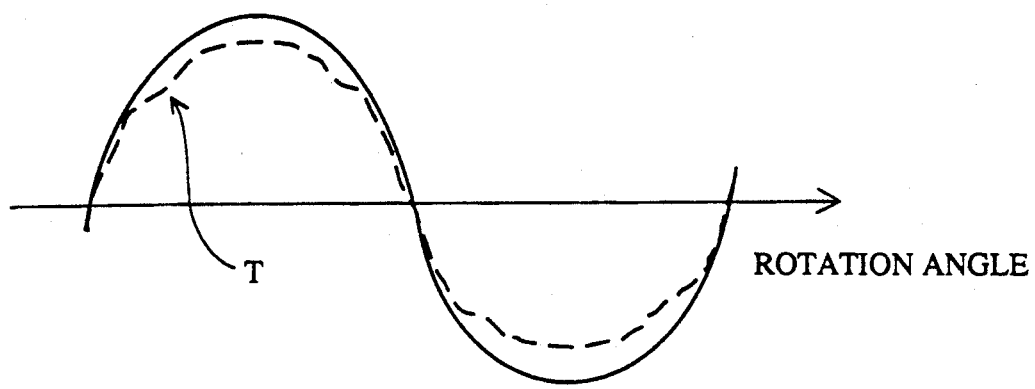
FIG. 3 is a graph showing a wave form of a magnetic flux density distribution.

The wide-angle arc segment magnet produced by a wet molding method shows a magnetic flux density distribution having a smooth wave form substantially free from deformation in a circumferential direction approximately on an inner surface thereof, as shown by the solid line in FIG. 3. Accordingly, when used in a motor, it generates only smaller magnetic noises, ensuring smooth rotation. On the other hand, when an arc segment magnet produced by a dry molding method having an arc angle smaller than 170° is used, the resulting cylindrical magnet assembly shows a magnetic flux density distribution having a deformed wave form as shown by the dotted line in FIG. 3. Particularly a portion T of the curve contributes to the generation of magnetic noises.

Since the wide-angle arc segment magnet of the present invention has an arc angle $\theta$ of up to 180°, only a small gap is provided when two wide-angle arc segment magnets are assembled in a cylindrical yoke. Accordingly, the wave form of the magnetic flux density distribution is less likely to be deformed during the operation of a motor, thereby causing little vibration and noise. Therefore, a rotor of the motor can rotate smoothly without suffering from unevenness.

The arc segment magnet of the present invention is covered by a cylindrical yoke to reduce magnetic resistance in a magnetic circuit.

Figure 1:
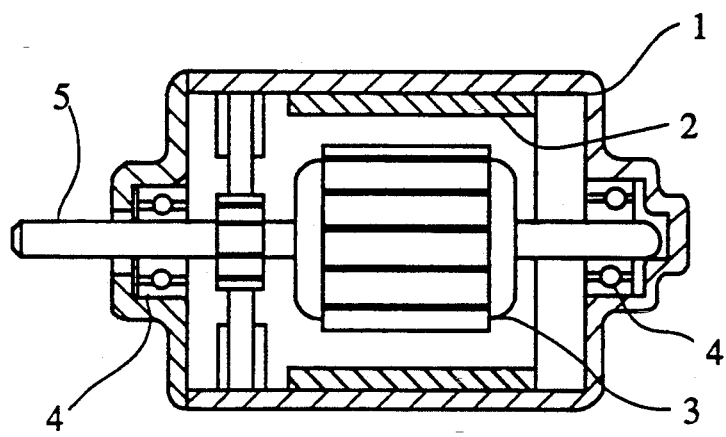
FIG. 1 is a cross-sectional view showing a brush motor containing two wide-angle arc segment magnets according to one embodiment of the present invention.
Figure 2:
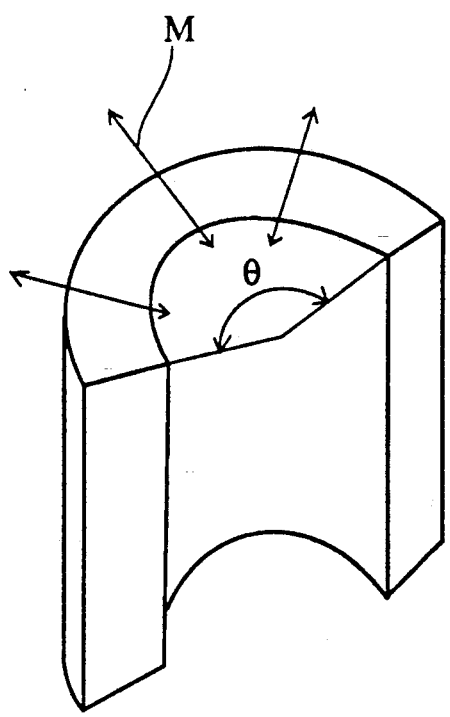
FIG. 2 is a perspective view showing a wide-angle arc segment magnet according to the present invention.

As shown in FIG. 1, the brush motor of the present invention comprises a cylindrical yoke 1, an arc segment magnet assembly 2 supported by the cylindrical yoke 1, a rotor 3 rotatably disposed inside the arc segment magnet assembly 2, a shaft 5 of the rotor 3 and bearings 4 mounted to a bracket of the brush motor for rotatably supporting the shaft 5. The wide-angle arc segment magnet assembly 2 is constituted by two wide-angle arc segment magnets produced by a wet molding method and having an arc angle $\theta$ of 170°–180°.

Incidentally, it has been considered to be difficult to produce an arc segment magnet having an arc angle $\theta$ up to 180° by a wet molding method, but the inventors have succeeded in the production of an arc segment magnet having an arc angle $\theta$ of up to 180° by a wet molding method, by utilizing the phenomenon that a center portion and end portions of the arc segment magnet show different shrinkage ratios. For instance, by making the thickness $t_1$ of each circumferential end portion slightly larger than the thickness $t_2$ of a center portion, uneven deformation by sintering can be prevented. In this case, the circumferential portions are trimmed after sintering. Alternatively, a load may be applied in such a direction as to prevent an uneven deformation by sintering. Further, a higher pressure for charging a slurry into the cavity may be utilized to increase the density of the end portions.

With respect to the wet molding method, a slurry of magnet powder may be used. As magnetic powder, ferrite powder is preferable. The ferrite is generally expressed by the formula: $MO.6Fe_2O_3$ wherein M is Ba, Sr, etc. The ferrite powder preferably has an average particle size of 0.5–3 μm, and the concentration of the ferrite powder in the slip is 50–75 weight %, preferably 60–70 weight %. When the average particle size of the ferrite powder is less than 0.5 μm, the leakage of the ferrite slurry, the clogging of a filter (reduction of dewatering capacity), the deterioration of moldability, etc. may take place. On the other hand, when it exceeds 3 μm, it is larger than the sizes of single magnetic domain particles, resulting in the decrease of iHc. With respect to the concentration, when it is less than 50 weight %, filtrability of the slurry is reduced. On the other hand, when it exceeds 75 weight %, the orientation of magnetic particles in a magnetic field is lowered.

Figure 9:
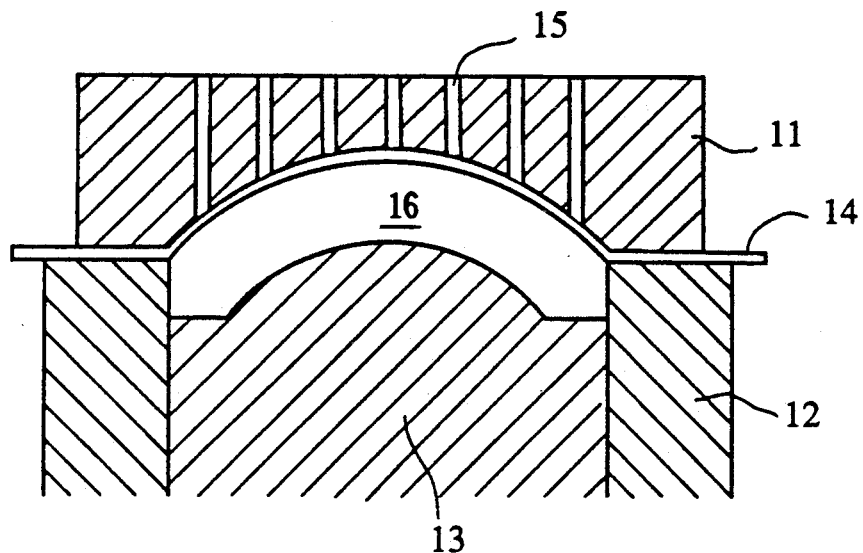
FIG. 9 is a cross-sectional view showing a wet molding die apparatus.
Figure 10:
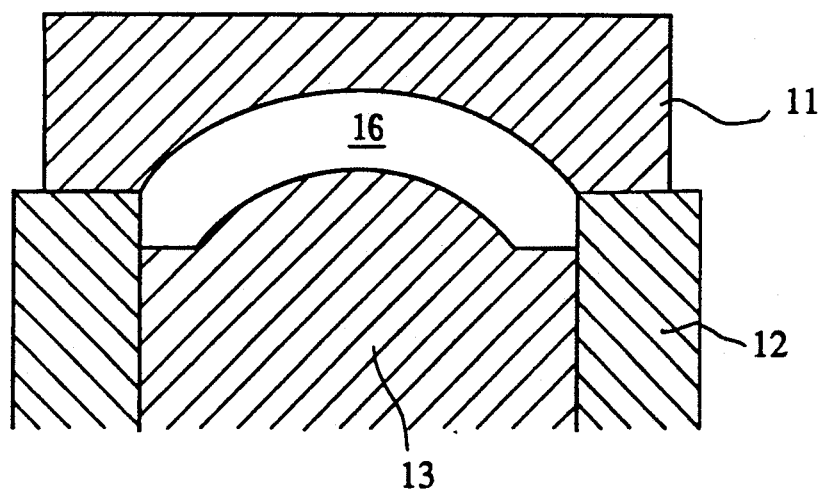
FIG. 10 is a cross-sectional view showing a dry molding die apparatus.

A wet molding die apparatus is typically shown in FIG. 9. The die apparatus comprising an upper die 11 having a cylindrical recess, a lower die 12 having an aperture, a plunger 13 having a top surface provided with a cylindrical center projection and movable up and down in the aperture of the lower die. A cavity 16 in an arcuate shape is defined by the cylindrical recess of the upper die 11 and the top surface of the plunger 13. The upper die 11 has a plurality of pores 15 for permitting water to pass therethrough. A filter 14 is placed inside the cavity 16 along the cylindrical recess of the upper die 11.

The slurry is introduced into the cavity 16 and compressed by the plunger 13 while removing water from the slurry by filtration. After molding, the green body is removed from the die.

During the wet molding operation, a magnetic field is applied to give magnetic anisotropy to the arc segment magnet. In a preferred embodiment, a radial magnetic anisotropy is given to the green body.

The green body is then sintered at 900°–1400° C. for about 1–10 hours. When the sintering temperature is lower than 900° C., sintering does not take place. On the other hand, when it exceeds 1400° C., the resulting magnet has a low iHc. The sintering time may be determined depending on the sintering temperature.

By sintering, a slight deformation may take place. Accordingly, the green body should have such a shape that it is changed to a desired arc shape having an arc angle of 170°–180°. For this purpose, the above-described means may be applied.

In the present invention, particularly remarkable effects can be obtained in the case of a large arc segment magnet. When the arc segment magnet has an outer diameter of about 30 mm or more, a thickness of about 3 mm or more and a length of about 25 mm or more, deformation and cracking are likely to take place in the course of molding and sintering. Accordingly, such arc segment magnet is preferably produced by a wet molding method, so that it can have an arc angle of 170°–180°.

The present invention will be explained in further detail by means of the following Examples.

EXAMPLE 1

Arc segment magnets having shapes and dimensions shown in 2 in Table 1 were produced from a ferrite powder slip by a wet molding method and sintering at 1240° C. The magnet material was produced from iron oxide and strontium carbonate in a molar ratio of 5.8, and had an average particle size of 1.1 μm.

Figure 4:
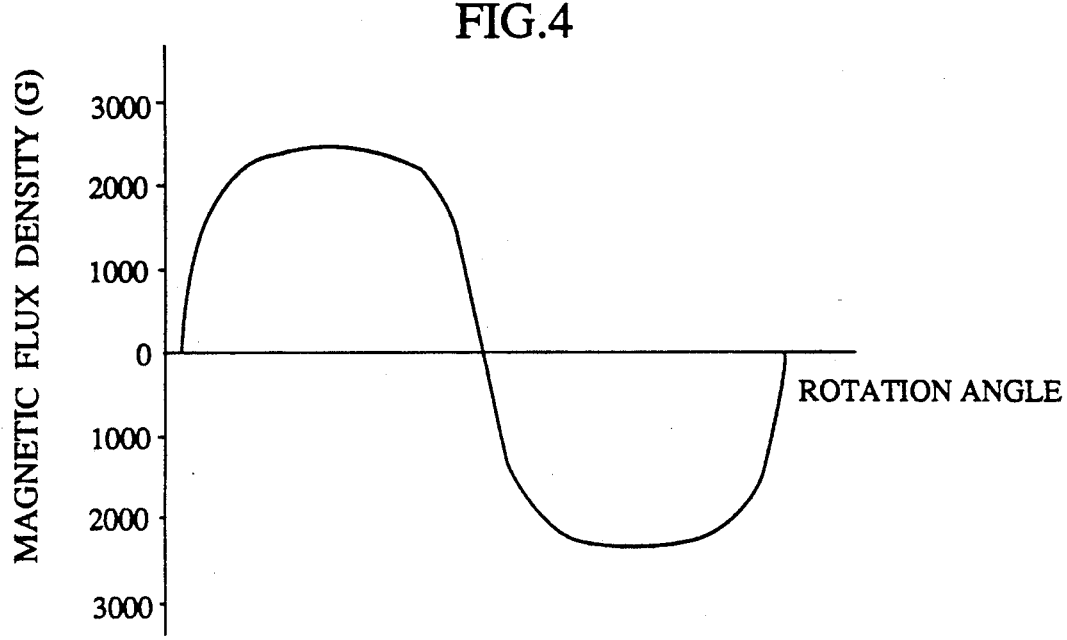
FIG. 4–6 are graphs each showing a magnetic flux density distribution wave form according to different embodiments of the present invention.
Figure 5:
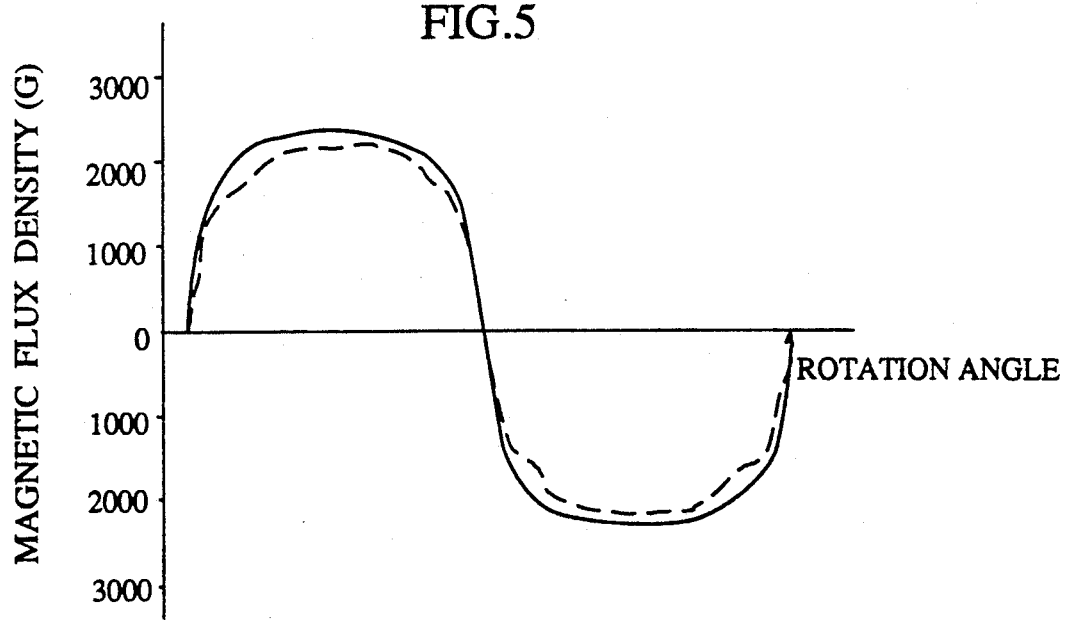
Figure 6:
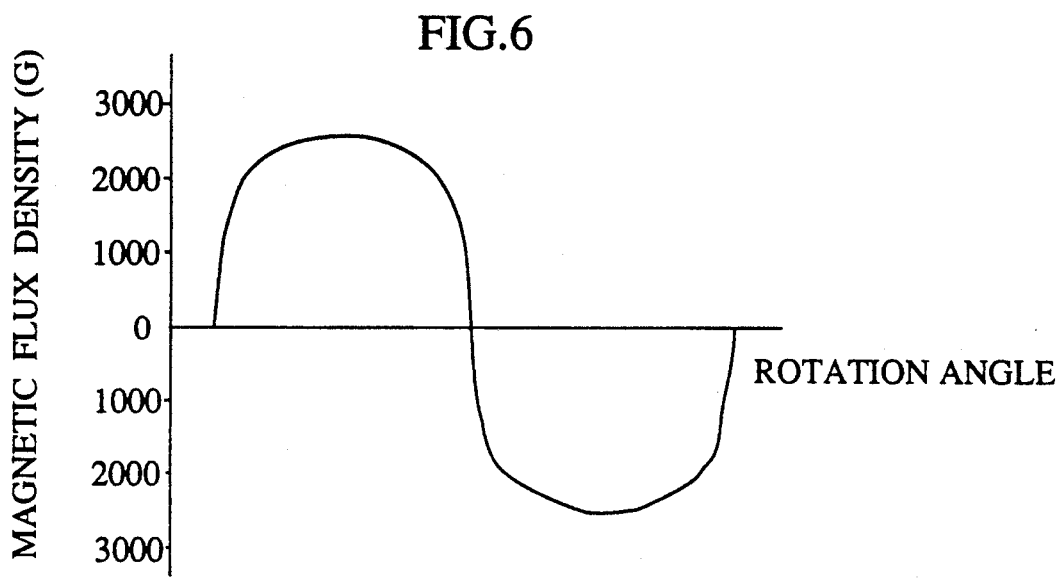

The resulting arc segment magnets (a)–(c) had magnetic properties shown in Table 2, and magnetic flux density distribution wave forms as shown in FIGS. 4–6. Incidentally, the measurement of the magnetic flux density distribution was conducted by a probe disposed on a rotor rotating within the permanent magnet assembly constituted by a pair of the arc segment magnets. The distance of the probe from the inner surface of the permanent magnet assembly was about 0.7 mm.

TABLE 1

| Sample No. | Arc Angle | Length in Longitudinal Direction (mm) | Inner Diameter (mm) | Outer Diameter (mm) |
|---|---|---|---|---|
| a | 170° | 45 | 42 | 53.0 |
| b | 175° | 45 | 42 | 53.0 |
| c | 180° | 45 | 42 | 53.0 |

TABLE 2

| Sample No. | Br | Hc | iHc |
|---|---|---|---|
| a | 3,876 | 3,064 | 3,144 |
| b | 3,876 | 3,064 | 3,144 |
| c | 3,876 | 3,064 | 3,144 |
| * | 3,602 | 2,952 | 3,254 |

Note
*: Comparative Example

Wave forms shown in FIGS. 4–6 are smooth curves substantially free from deformation. Motors using the above arc segment magnets (a)–(c) did not generate magnetic noises and suffered from little rotation unevenness.

For comparison, an arc segment magnet having the same dimension as (b) above was produced by a dry molding method and sintering at 1240° C. It showed a magnetic flux density distribution wave form shown in FIG. 5 by the dotted line. It is clear from FIG. 5 that the magnetic flux density distribution wave form of the arc segment magnet (Comparative Example) has substantial deformation.

EXAMPLE 2

Figure 8:
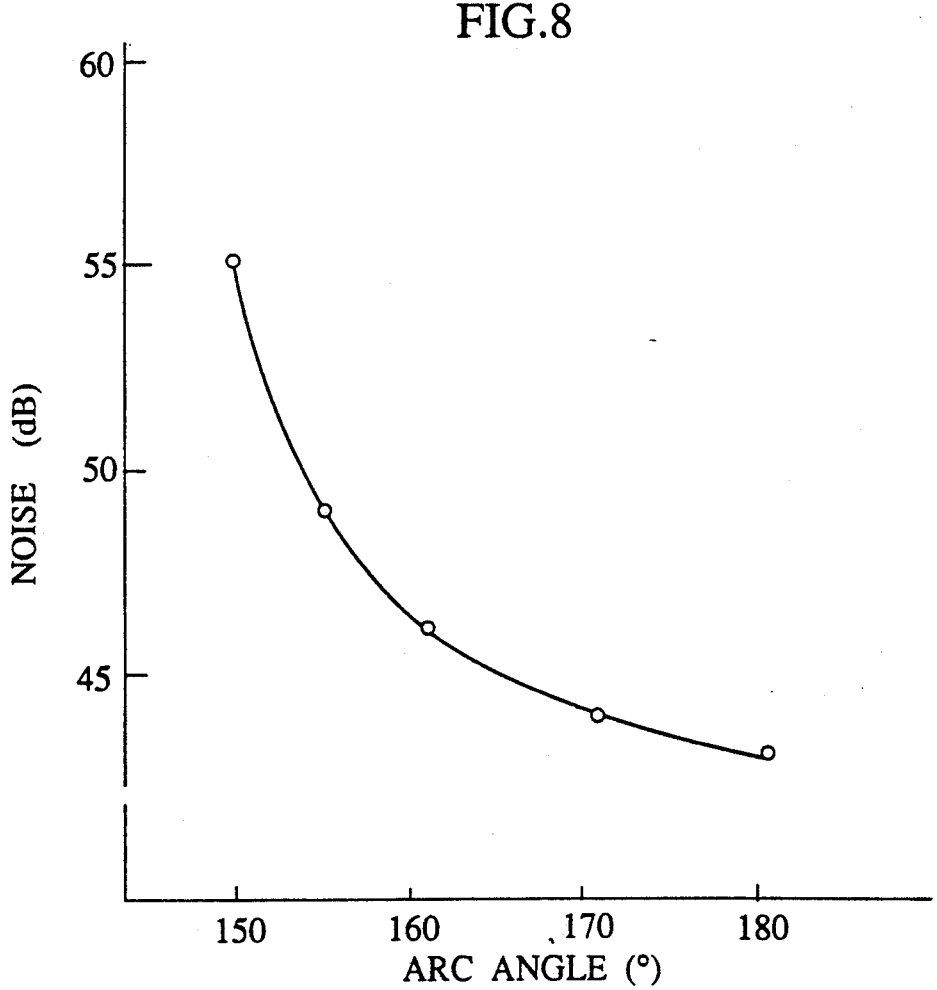
FIG. 8 is a graph showing the relation between an arc angle $\theta$ and magnetic noises.
Figure 7:
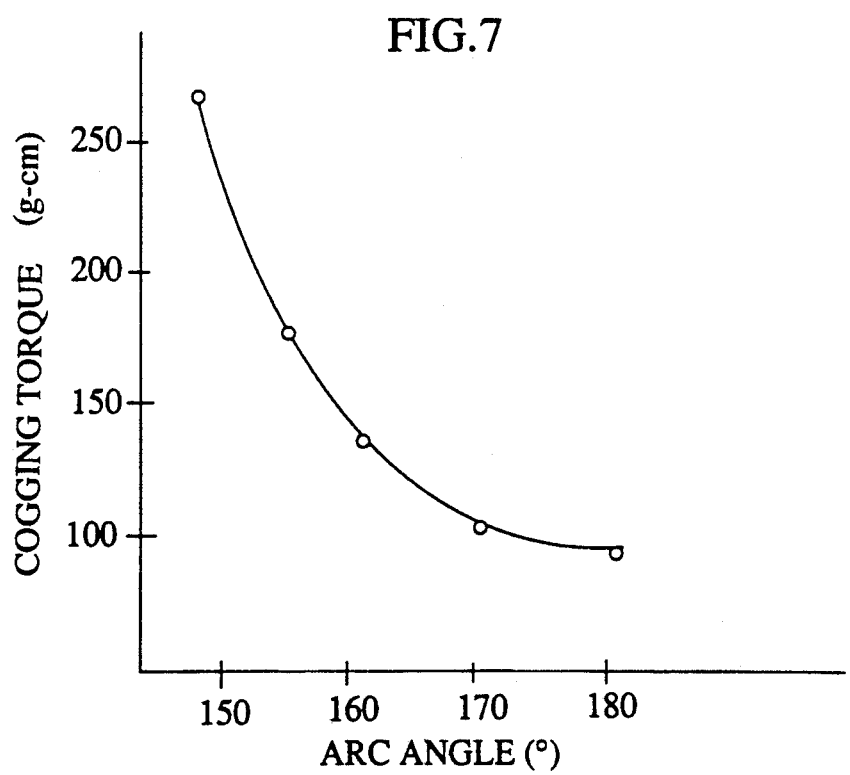
FIG. 7 is a graph showing the relation between an arc angle $\theta$ and cogging.

Arc segment magnets having different arc angles θ from 150° to 180° were used in the brush motor shown in FIG. 1, and cogging and magnetic noises were measured. The results are shown in FIGS. 7 and 8. It is clear from FIGS. 7 and 8 that remarkable effects can be obtained when the arc angle θ is between 170° and 180°.

Since the arc segment magnet of the present invention has an arc angle θ of 170°–180°, it shows a wave form of magnetic flux density distribution which is a smooth curve substantially free from deformation, thereby preventing magnetic noises. Further, the production of wide-angle arc segment magnets by a wet molding method is economically advantageous.

What is claimed is:

1. An improved brush motor comprising a stator assembly constituted by a permanent magnet assembly and a cylindrical yoke, a rotor provided with coils diametrically opposing to each other and rotatably disposed within said stator assembly, and a brush, characterized by: said permanent magnet assembly being constituted by two arc segment magnets each having magnetic anisotropy in a radial direction and an arc angle Θ of 170°–180°, said two arc segments comprising a pair of wet molded and sintered wide-angle arc segments of ferrite.

2. The brush motor according to claim 1, wherein said permanent magnet assembly has a magnetic flux density distribution having a smooth wave form substantially free from localized deformations in a circumferential direction.

3. A wet molded and sintered wide-angle arc segment magnet having an arc angle Θ of 170°–180° and an intrinsic coercive force iHc of 2850 Oe or more.

4. The wide-angle arc segment magnet according to claim 3, wherein it has a residual magnetic flux density Br of 3800 G or more.

5. A magnetic circuit comprising:
a pair of wet molded and sintered arc segment magnets made of ferrite and assembled such that said pair of arc segment magnets has a magnetic flux density distribution having a smooth wave form substantially free from localized deformations in a circumferential direction; wherein each of said pair of arc segment magnets having an arc angle Θ between 170°–180° and an intrinsic coercive force of at least 2850 Oe.

* * * * *